(12) United States Patent
Boinowitz et al.

(10) Patent No.: US 8,377,359 B2
(45) Date of Patent: Feb. 19, 2013

(54) PROCESS FOR THE PRODUCTION OF MOLDINGS FROM CELLULOSE-CONTAINING MATERIALS

(75) Inventors: Tammo Boinowitz, Essen (DE); Torsten Henning, Schwerin (DE); Helmut Lammerting, Witten (DE)

(73) Assignee: Evonik Goldschmidt GmbH, Essen (DE)

( * ) Notice: Subject to any disclaimer, the term of this patent is extended or adjusted under 35 U.S.C. 154(b) by 1600 days.

(21) Appl. No.: 11/410,482

(22) Filed: Apr. 25, 2006

(65) Prior Publication Data

US 2006/0249882 A1    Nov. 9, 2006

(30) Foreign Application Priority Data

May 6, 2005    (DE) .................. 10 2005 021 059

(51) Int. Cl.
    *B29C 39/00*    (2006.01)
(52) U.S. Cl. ...................... 264/300; 264/299
(58) Field of Classification Search .................. 264/300
    See application file for complete search history.

(56) References Cited

U.S. PATENT DOCUMENTS

| 5,531,813 | A | * | 7/1996 | Henry et al. ............... 106/2 |
| 2003/0211050 | A1 | * | 11/2003 | Majeti et al. ............... 424/49 |
| 2005/0287372 | A1 | * | 12/2005 | Gervasi et al. ............ 428/421 |

FOREIGN PATENT DOCUMENTS

| DE | 197 38 192 C1 | 12/1998 |
| DE | 103 37 594 A1 | 3/2005 |
| EP | 0 046 014 B1 | 2/1982 |
| EP | 0 057 502 B1 | 8/1982 |
| EP | 0 129 430 B1 | 12/1984 |
| EP | 0 207 192 A1 | 1/1987 |
| EP | 0 269 869 A2 | 6/1988 |
| WO | WO 98/00464 A1 | 1/1998 |
| WO | WO 00/53381 A1 | 9/2000 |
| WO | WO 01/58998 A1 | 8/2001 |
| WO | WO 02/36268 A1 | 5/2002 |
| WO | WO 03/008164 A2 | 1/2003 |
| WO | WO 03/072324 A1 | 9/2003 |
| WO | WO 2005052030 A1 | * | 6/2005 |

* cited by examiner

*Primary Examiner* — Monica A Huson
(74) *Attorney, Agent, or Firm* — Scully, Scott, Murphy & Presser, P.C.

(57) ABSTRACT

A process for the production of compact cellulose-containing moldings by reacting optionally modified organic polyisocyanates with cellulose, in particular lignocellulose, in the presence of mold release agents in an open or closed mold, wherein the mold release agents used are siloxane compounds containing aminopropyl groups and of the general formula (I)

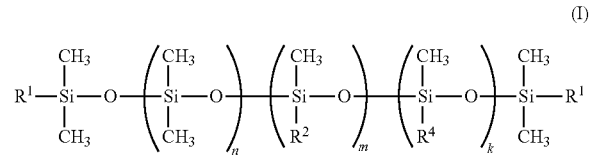

in which
$R^1$ is $CH_3$ and/or $R^2$,
$R^2$ is $-(CH_2)_x-NH-R^3$ and/or $-(O)_y-(CH_2)_x-NH-R^{3'}$,
$R^3$ and $R^{3'}$, independently of one another, may be H or $-(CH_2)_x-NH_2$,
$R^4$ is $-(CH_2)_x-NH-(CH_2-CH_2-O)_z-R^5$ where $R^5$ is an aryl or alkyl radical
n is from 50 to 1000,
m is from 0 to 20, with the ratio m:n=0 to 0.4,
k is from 0 to 20,
x is from 1 to 20,
y is 0 or 1,
z is from 1 to 20,
with the proviso that at least one amino-functionalized radical is present.

9 Claims, No Drawings

PROCESS FOR THE PRODUCTION OF MOLDINGS FROM CELLULOSE-CONTAINING MATERIALS

FIELD OF THE INVENTION

The present invention relates to a process for the production of compact cellulose-containing moldings by reacting optionally modified organic polyisocyanates with cellulose, in particular lignocellulose, in the presence of mold release agents in an open or closed mold. Moreover, the present invention is related to siloxane compounds containing aminopropyl groups that are used as mold release agents and to the use of the siloxane compounds containing aminopropyl groups as mold release agents for moldings comprising polyisocyanate-cellulose adducts.

BACKGROUND OF THE INVENTION

The production of compressed, shaped articles designated as "composites" from small wood pieces, wood fibers or wood particles, such as, for example, OSB boards (oriented strand board), particleboards, fiberboards or plywood, but also cork boards and moldings comprising flax, straw and other cellulose-containing materials using isocyanate binders, optionally in the presence or absence of catalysts, auxiliaries and/or additives in an open or closed mold is known from numerous patent and literature publications.

In these processes, temperatures of from 90° to 270° C. are necessary in order to ensure the reaction of the isocyanate binder with the cellulose-containing material and to permit molding of the materials to give the desired final shape, such as, for example, boards or sheets.

Although the production of compact cellulose/isocyanate moldings has become very important industrially, the processes described in the prior art also have technical deficiencies, for example owing to the outstanding adhesion of polyurethanes to other materials. A particular disadvantage in the prior art processes is that the moldings adhere to the molds and are therefore difficult to remove from the mold, which frequently leads to damage to the molding, in particular the surface thereof. In order to avoid this disadvantage, as a rule, polished metallic molds are used and/or release agents are concomitantly used.

These mold release agents are either used as internal lubricants in the curable cellulose-isocyanate mixture, or the inner surfaces of the mold are provided with a uniform coating of external lubricants before the production of the moldings. Various injection and spraying and roll application methods (DE-10 337 594) are known for this purpose in the prior art. It is also possible to coat the surface of the wood strands with a mold release agent. This is also effected by application by spraying.

Conventional internal or external lubricants used are, for example, fatty acids and the metal salts thereof (WO-A-03/072324, WO-A-02/36268), polymeric fatty acids (EP-A-0 269 869), carboxy-functionalized siloxanes (EP-B-0 129 430), waxes (EP-B-0 046 014) especially ester wax (EP-B-0 057 502), oxidized wax (WO-A-00/53381) or polyolefin wax (WO-A-98/00464), polyolefin wax in combination with fatty acids (WO-A-01/58998) or finally fatty acids or wax acids in combination with polysiloxanes, which are modified with an organically bonded active hydrogen group and are capable of reacting with isocyanate (WO-A-03/008164).

Such conventional release agents have the disadvantage that the surface of prepared moldings show dark discoloration, which greatly impairs the optical value. Furthermore, the press plates frequently exhibit black accumulated residues. This is because the conventionally used release agents are not thermally stable or stable to oxidation at the temperatures used in the process and/or tend to produce hard, generally black solid accumulated residues on the metal plates.

These accumulated residues can, in turn, also be deposited on the moldings produced and, in this way, also lead to dark discolorations and/or irregularities in the surface structure thereof or, particularly in the case of silicone-containing release agents, lead to considerable coating problems. In some cases, an after-treatment such as grinding of the surface is necessitated thereby.

The release agents currently used industrially for demolding of shaped articles usually contain substances dispersed in a carrier and having release properties.

Carriers used are, as a rule, organic solvents or water. They serve not only as carriers for the materials having release properties and as solvents for further additives, but also for establishing an optimum concentration, as auxiliaries for wetting and leveling and in the formation of the release agent film and for influencing the surface of the shaped polyurethane article. Operational safety, cost efficiency and ecological safety are further requirements which the carrier has to meet.

The greatly increased interest in environmental protection and the more stringent legal provisions associated therewith lead to efforts to reduce volatile organic solvents (so-called VOCs) to an acceptable minimum.

The release agents currently used industrially for demolding of shaped articles usually contain substances dispersed in a carrier and having release properties, such as, oils, waxes, silicones and/or soaps.

EP-A-0 207 192 describes silicone resins as semipermanent release agents for the press plates, which cure on the press plates and permit repeated demolding. This reference mentions amino-functionalized siloxanes in combination with silicone resins. Additional, this reference indicates that the release agent should acquire a certain compatability with the resin matrix, which ensures incorporation into the matrix. The problems already described and relating to the formation of dark accumulated residues on the press plates are, however, not eliminated by this prior art release agent.

DE-C-19 738 192 describes release agents for molds for the production of moldings from plastics composed of volatile polysiloxanes having chain lengths of 7 to 13, in which from 0.1 to 5.0% by weight of a polysiloxane containing γ-aminopropyl groups is concomitantly used. The release agent is used at room temperature, or temperatures of up to 50° C. However, these release agents cannot be used for the present application since the volatile polysiloxanes can no longer act as release agents at high application temperatures from 180° to 270° C. and/or do not permit the formation of a uniform release agent film on the press plates. Furthermore, it was to be feared that discolorations occur with the use of polysiloxanes containing amine groups.

SUMMARY OF THE INVENTION

An object of the present invention is therefore to provide release agents which, at high temperatures up to 270° C., preferably from 180° to 240° C., are stable and nonvolatile and are not degraded thermally or oxidatively to dark colored compounds and furthermore do not form solid accumulated residues.

It is a further object of the present invention to provide release agents which can remain on the molding even on detachment from the metal press, without forming discolorations on said molding or impairing any further processing steps (coatability).

Surprisingly, it has now been found that amino-functionalized siloxanes are outstandingly suitable as release agents and, when used in the production of (ligno)cellulose-containing products, do not cause any discolorations on the surface of the moldings and do not form any solid accumulated residues on the press plates.

The present invention therefore relates to a process for the production of compact cellulose-containing moldings by reacting optionally modified organic polyisocyanates with cellulose, in particular lignocellulose, in the presence of mold release agents in an open or closed mold, wherein the mold release agents used are siloxane compounds containing aminopropyl groups and of the general formula (I)

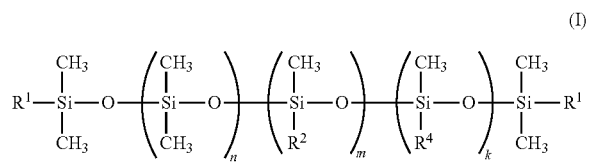

in which
$R^1$ is $CH_3$ and/or $R^2$,
$R^2$ is $-(CH_2)_x-NH-R^3$ and/or $-(O)_y-(CH_2)_x-NH-R^{3'}$,
$R^3$ and $R^{3'}$, independently of one another, may be H or $-(CH_2)_x-NH_2$,
$R^4$ is $-(CH_2)_x-NH-(CH_2-CH_2-O)_z-R^5$ where
$R^5$ is an aryl or alkyl radical
n is from 50 to 1000, preferably from 100 to 500, in particular from 100 to 200,
m is from 0 to 20, preferably from 0 to 5, with the ratio m:n=0 to 0.4, preferably 0.01 to 0.1,
k is from 0 to 20, preferably from 0 to 5,
x is from 1 to 20, preferably 1 to 5,
y is 0 or 1,
z is from 1 to 20, preferably 1 to 10,
with the proviso that at least one amino-functionalized radical is present.

The invention furthermore relates to use of siloxane compounds containing aminopropyl groups as mold release agents for moldings comprising polyisocyanate-cellulose adducts.

In a further preferred form, the amino-functionalized siloxanes may additionally be functionalized so that they are self-emulsifiable. This is the case as a rule, when, in the general formula (I) k has the meaning ≧1, preferably >2.

In this case, it is possible to dispense with further substances which do not have release properties and which might lead to discolorations at high application temperatures.

DETAILED DESCRIPTION OF THE INVENTION

As stated above, the present invention provides amino-functionalized siloxanes which are employed as releasing agents for molding applications.

The amino-functionalized siloxanes according to the present invention are prepared by the processes known in the prior art and can be used according to the invention in this form without further processing steps.

These amino-functionalized siloxanes can be used in pure form as release agents. However, since they give outstanding release results even in very low concentrations, they can also be mixed in amounts from 1 to 98% by weight, preferably from 1 to 20% by weight, particularly preferably from 1 to 5% by weight, with organic and inorganic solvents.

Organic solvents are less preferred since they have lower ignition points and may ignite in the region of the application temperatures. More suitable are cyclic or linear siloxanes, suitable siloxanes are only those whose ignition point is above the application temperatures used.

Water, in amounts from 2 to 99% by weight, preferably from 80 to 99% by weight, particularly preferably from 95 to 99% by weight, is preferably used as an inorganic solvent or carrier medium.

The following may be used as customary auxiliaries and additives:
Anionic emulsifiers such as alkyl ether carboxylates, alkylsulfates, fatty alcohol ethoxylate ether sulfates, alpha-olefin-sulfonates, alkylphosphates, alkyl polyether phosphates, alkylsulfosuccinates; nonionic emulsifiers, such as, fatty alcohols, ethoxylated fatty alcohols, ethoxylated oxo alcohols and other alcohol ethers, fatty amines, such as, dimethylalkylamines, fatty acid alkanolamides, fatty acid esters with alcohols, including glyceryl esters or polyglyceryl esters or sorbitol esters; cationic emulsifiers, such as acidified alkyldimethylamines, quaternary nitrogen compounds; finally zwitterionic surfactants or combinations of the emulsifiers in amounts from 0.1 to 10% by weight, preferably from 0.5 to 6% by weight.

As catalysts, those which are typically used for the polyurethane reaction. For example Lewis acids, such as tin compounds or Lewis bases such as tertiary amines.

As viscosity modifiers, typical thickeners, such as polyelectrolyte thickeners.

As preservatives, bactericides and fungicides.

Commercial antioxidants can also be used.

Additives for influencing the conductivity, such as anti static additives or conductivity-enhancing additives.

In a further preferred embodiment of the present invention the release agent is present in the form of an emulsion.

In order to prepare an emulsion according to the invention, it is possible to use any known method; in the preferred procedure, the emulsifier is initially taken with an amino-functionalized siloxane, a part of the water is introduced at a high sheer force, and the remaining water is then added with little sheer force.

Before use, the mixtures according to the invention, preferably aqueous emulsions, can be further diluted; application concentrations are from 2 to 20% by weight, based on the release agent.

The invention furthermore relates to the use of the release agents described in the production of lignocellulose-containing products which are produced using isocyanate binders by one of the customary industrial processes.

Classically, lignocellulose material in fiber or particle form is initially taken, isocyanate binder is then added and molding is then effected in a metal press. The release agents described are sprayed onto the metal plates or metal rolls before the pressing process, as described, for example in WO-A-02/36268. Finally, the pressed material is removed from the metal press.

The following examples, which do not limit the present invention in any manner, are provided to illustrate the present application and to demonstrate some advantages that are obtained from using the inventive amino-functionalized siloxane releasing agents.

List of Substances Used

Genapol® X 050=tridecyl alcohol polyglycol ether with 5 mol of ethylene oxide, manufacturer Clariant.

Genapol® O 300=oleyl alcohol polyglcol ether with 30 mol of ethylene oxide, manufacturer Clariant.

Emulsogen® PN Extra=mixture of fatty alcohol polyglycol ethers, manufacturer Clariant.

Licowachs® KPE=emulsifier-containing montan ester wax, manufacturer Clariant.

Preparation of the Release Agent Emulsions

Release Agent 1

40 g Genapol® X 050, 40 g Genapol® O 300 and 400 g amino-functionalized siloxane of the formula 1, with n=80, m=1, $R^1=CH_3$ and $R^2=-(CH_2)_x-NH-R^3$ where x=3 and $R^3$=H were mixed with 50 g of water with vigorous stirring and then diluted with 5470 g of water to give the final emulsion.

Release Agent 2

40 g Genapol® X 050, 40 g Genapol® O 300 and 600 g amino-functionalized siloxane of the formula 1, with n=140, m=2, $R^1=CH_3$ and $R^2=-(CH_2)_x-NH-R^3$ where x=3 and $R^3$=H were mixed with 50 g of water with vigorous stirring and then diluted with 5270 g of water to give the final emulsion.

Release Agent 3

40 g Genapol® X 050, 40 g Genapol® O 300 and 800 g amino-functionalized siloxane of the formula 1, with n=200, m=3, $R^1=CH_3$ and $R^2=-(CH_2)_x-NH-R^3$ where x=3 and $R^3$=H were mixed with 50 g of water with vigorous stirring and then diluted with 5070 g of water to give the final emulsion.

Comparative Example A

As comparative release agent A, 80 g of Emulsogen® PN Extra and 400 g of Licowachs® KPE were mixed with 50 g of water at elevated temperature with vigorous stirring and then diluted with 5470 g water to give the final emulsion.

Comparative Example B (Example No. 2 from DE-C-19 738 192)

As comparative release agent B, 240 g of Genapol® X 050 and 1080 g of polysiloxane having from 10 to 15 units and 3 g of amino-functionalized siloxane analogous to formula 1, where n=100, m=2, $R^1=CH_3$ and $R^2=-(CH_2)_x-NH-R^3$ with x=3 and $R^3$=H were mixed with 50 g of water with vigorous stirring and then diluted with 4617 g of water to give the final emulsion.

Release Agent Experiments

The release agent emulsions were applied by means of a nozzle in amounts of 30 g/m² to the metal presses in the form of metal belts. Small wood pieces were mixed with crude diphenylmethane diisocyanate (MDI) and pressed at a temperature of 240° C. The belt speed was 30 m/min, the web width 3 m and the board thickness 20 mm.

Evaluation of the release agent experiments:

| Release agent | Appearance of the wood boards | Metal belts |
| --- | --- | --- |
| 1 | Pale | Without black accumulated residues, easy cleaning possible |
| 2 | Pale | Without black accumulated residues, easy cleaning possible |
| 3 | Pale | Without black accumulated residues, easy cleaning possible |

Evaluation of the release agent experiments:

| Release agent | Appearance of the wood boards | Metal belts |
| --- | --- | --- |
| A | Generally darker, dark spots | Black accumulated residues, cleaning complicated |
| B | Release agent cannot be used, release film breaks off during use (polysiloxane volatilizes) | — |

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A process for the production of compact cellulose-containing moldings by reacting organic polyisocyanates with cellulose in the presence of mold release agents in an open or closed mold, wherein the mold release agents are siloxane compounds containing aminopropyl groups having the general formula (I)

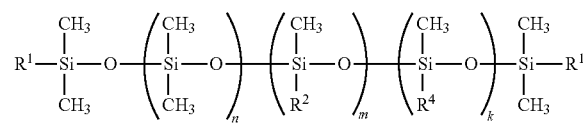

in which $R^1$ is $CH_3$ and/or $R^2$, $R^2$ is $-(CH_2)_x-NH-R^3$ and/or $-(O)_y-(CH_2)_x-NH-R^{3'}$, $R^3$ and $R^{3'}$, independently of one another, may be H or $-(CH_2)_x-NH_2$, $R^4$ is $-(CH_2)_x-NH-(CH_2-CH_2-O)_z-R^5$ where $R^5$ is an aryl or alkyl radical n is from 50 to 1000, m is from 1 to 20, k is from 0 to 20, x is from 1 to 20, y is 0 or 1, z is from 1 to 20, and wherein said release agent is stable, non-volatile and does not degrade thermally or oxidatively to dark colored compounds at a temperature up to 270° C., with the proviso that at least one amino-functionalized radical is present.

2. The process as claimed in claim 1, wherein $R^1=CH_3$.

3. The process as claimed in claim 1, wherein x is from 1 to 5.

4. The process as claimed in claim 1, wherein n is from 100 to 500.

5. The process as claimed in claim 1, wherein the ratio of m:n is from 0.01 to 0.1.

6. The process as claimed in claim 1, wherein the mold release agent used is an aqueous emulsion containing from 1 to 99% by weight of at least one of the compounds of the general formula (I).

7. The process as claimed in claim 1, wherein the organic polyisocyanates are optionally modified.

8. The process as claimed in claim 1, wherein the cellulose is lignocellulose.

9. The process as claimed in claim 1, wherein n is from 50 to 200.

* * * * *